United States Patent [19]
Teramachi et al.

[11] Patent Number: 6,069,004
[45] Date of Patent: May 30, 2000

[54] CIRCULATORY MICROORGANIC DEODORIZING SYSTEM

[75] Inventors: Masayoshi Teramachi; Ryouzo Matsumoto, both of Nagoya, Japan

[73] Assignee: Touyoudainamu Co., Ltd., Nagoya, Japan

[21] Appl. No.: 09/212,240

[22] Filed: Dec. 16, 1998

[30] Foreign Application Priority Data

Dec. 17, 1997 [JP] Japan ..................... 9-364599

[51] Int. Cl.$^7$ ................. C12M 3/00
[52] U.S. Cl. ............ 435/292.1; 435/293.1; 435/294.1; 435/297.1; 435/299.1
[58] Field of Search ............ 435/293.1, 294.1, 435/297.1, 292.1, 299.1

[56] References Cited

U.S. PATENT DOCUMENTS

| | | |
|---|---|---|
| 5,409,834 | 4/1995 | Birdwell . |
| 5,518,920 | 5/1996 | Stewart et al. ............ 435/266 |
| 5,635,394 | 6/1997 | Horn ..................... 435/266 |
| 5,656,494 | 8/1997 | Kant et al. .............. 435/294.1 |
| 5,891,711 | 4/1999 | Carter .................. 435/299.1 |

*Primary Examiner*—David A. Redding
*Attorney, Agent, or Firm*—Flynn, Thiel, Boutell & Tanis, P.C.

[57] ABSTRACT

A circulatory microorganic deodorizing system has the inner space of a tower main body partitioned into an upper deodorization chamber, a middle level deodorization chamber, and a lower deodorization chamber. In the lower deodorization chamber, exhaust gas G is brought into contact with process water in a filmy state and cooled down while water soluble offensive odor constituents and dust, contained in the exhaust gas G, are removed by absorption. Water soluble offensive odor constituents and dust, contained in polluted water, are cleansed through decomposition and deodorization processing by the agency of microorganisms, and residual offensive odor constituents are adsorbed and then decomposed by the agency of a filler and microorganisms in the middle level deodorization chamber and the upper deodorization chamber, respectively, so that the exhaust gas G is completely deodorized. Thus, the problem of deodorizing agents being clogged, resulting in deterioration of deodorizing capacity as with the case of conventional deodorizing systems is solved.

18 Claims, 10 Drawing Sheets

CIRCULATORY MICROORGANIC DEODORIZING SYSTEM

BACKGROUND OF THE INVENTION

1. Field of the Invention

The invention relates to a circulatory microorganic deodorizing system for decomposing offensive odor constituents of exhaust gas through the agency of microorganisms.

2. Description of the Related Art

With a well known deodorizing system a of this type as shown in FIG. 10, exhaust gas containing dust, offensive odor constituents, and so forth is fed below a deodorizing layer c of a tower main body b, filled with activated charcoal as a deodorizing agent, dust, and water soluble offensive odor constituents are removed from the exhaust gas by showering thereon with process water w supplied via a water supply system wr from a water reservoir d to be replenished as necessary, and the exhaust gas after subjected to a primary treatment is passed through the deodorizing layer c for deodorization.

In the deodorizing system a of this type, however, since dust, and water soluble offensive odor constituents are removed simply by showering the process water w in droplet form on the exhaust gas g, dust and like, and water insoluble offensive odor constituents, which have not been removed, will ascend in the tower main body b, reaching the activated charcoal in the deodorizing layer c.

While the water insoluble offensive odor constituents, and the like are adsorbed to pores of the activated charcoal, and the exhaust gas g after deodorized is emitted into the atmosphere, clogging of numerous pores of the activated charcoal occurs due to adsorption of the water insoluble offensive odor constituents, and the like to the pores with the result that functions of the activated charcoal for adsorption and deodorization are degraded. Consequently, the deodorizing system described has had a drawback of requiring periodical replacement of the activated charcoal.

Further, although the activated charcoal has strong power of adsorbing and holding methanethiol, sulfur compounds such as methyl sulfide and the like, alcohol, fatty acids, hydrocarbon halide, aliphatic hydrocarbon, aromatic hydrocarbon, ester, and the like, it hardly adsorbs formic acid having one carbon atom, formaldehyde, methyl alcohol, propane, methyl chloride, and the like while it has only small power of adsorbing ammonia, hydrogen sulfide, the like.

Consequently, the system has had a drawback that sufficient deodorization of exhaust gas containing various offensive odor constituents could not be achieved because it has been difficult for parts of the offensive odor constituents to be adsorbed to the activated charcoal even if other parts thereof could be adsorbed.

SUMMARY OF THE INVENTION

It is therefore an object of the invention to provide a circulatory microorganic deodorizing system capable of achieving sufficient deodorization of various offensive odor constituents of exhaust gas, maintaining excellent deodorizing capacity thereof by preventing degradation in adsorptive capacity of a deodorizing agent due to clogging thereof.

In light of problems encountered in the case of conventional deodorizing systems such as clogging of a deodorizing agent, degradation in adsorptive capacity thereof, and difficulty with removal of some types of offensive odor constituents, the invention provides a circulatory microorganic deodorizing system wherein, to put it briefly, multi-staged deodorization chambers are provided in a tower main body, exhaust gas emitted from exhaust gas ducts provided in one of the deodorization chambers, that is, a lower deodorization chamber is brought into contact with process water in filmy state to be cooled down while water soluble offensive odor constituents and dust contained in the exhaust gas are absorbed, removed, and dropped into a lower reservoir in the lower deodorization chamber to be mixed with process water therein so that the exhaust gas is deodorized and cleansed through decomposition treatment of water soluble offensive odor constituents and the like contained in polluted water by the agency of microorganisms inhabiting therein, and residual offensive odor constituents are subjected to decomposition treatment after adsorbed by adsorbents and microorganisms, in the other deodorization chambers, that is, a middle level deodorization chamber and an upper deodorization chamber, in sequence, thereby fully deodorizing the exhaust gas.

More specifically, the circulatory microorganic deodorizing system according to the invention comprises the tower main body, the inner space of which is partitioned into the upper deodorization chamber, the middle level deodorization chamber, and the lower deodorization chamber by two horizontal partition walls, link-ups being installed upright on each of the horizontal partition walls for linking the upper deodorization chamber with the middle level deodorization chamber, and also linking the middle level deodorization chamber with the lower deodorization chamber, respectively, the upper deodorization chamber being provided with an exhaust outlet while the lower deodorization chamber being provided with exhaust gas ducts in the upper part thereof, a lower reservoir for process water with photosynthetic bacteria mixed therein, provided in the lower part of the lower deodorization chamber, sprinklers for sprinkling the process water of the lower reservoir towards exhaust gas ducts, provided in the lower deodorization chamber, and an upper reservoir and a middle level reservoir, for process water with activated sludge bacteria mixed therein, provided in the lower part of the upper deodorization chamber and the middle level deodorization chamber, respectively, an upper filler having sources of nutrition supply for microorganisms as well as adsorbability filled above the upper reservoir of the upper deodorization chamber, a middle level filler having adsorbability, composed of a porous matter with pores of average diameter not less than about 100 Å, filled above the middle level reservoir of the middle level deodorization chamber, spray nozzles for spraying the process water of the upper reservoir and the middle level reservoir, disposed above the upper filler and the middle level filler in the upper deodorization chamber and the middle level deodorization chamber, respectively, so as to carry out a secondary processing and a tertiary processing of deodorizing the exhaust gas while removing residual water soluble offensive odor constituents.

The circulatory microorganic deodorizing system further comprises a filter cell disposed separately from the tower main body, wherein a filtering box installed in a filtering and water storage part of a filter section thereof is filled up with a filtering filler having adsorbability, composed of a porous matter with pores of average diameter not less than about 100 Å, and an inlet is provided above the filtering filler such that the process water in the lower reservoir of the lower deodorization chamber in the tower main body is fed freely to the inlet while linking the filtering and water storage part of the filter section with the sprinklers in the lower deodorization chamber via a circulatory pump so that polluted water resulting from deodorization treatment applied in the upper deodorization chamber, the middle level deodorization chamber, and the lower deodorization chamber is cleansed through adsorption with the filtering filler, and decomposition by the agency of microorganisms.

DESCRIPTION OF THE PREFERRED EMBODIMENTS

An embodiment of a circulatory microorganic deodorizing system according to the invention is described hereinafter with reference to FIG. 1.

Figure 1:
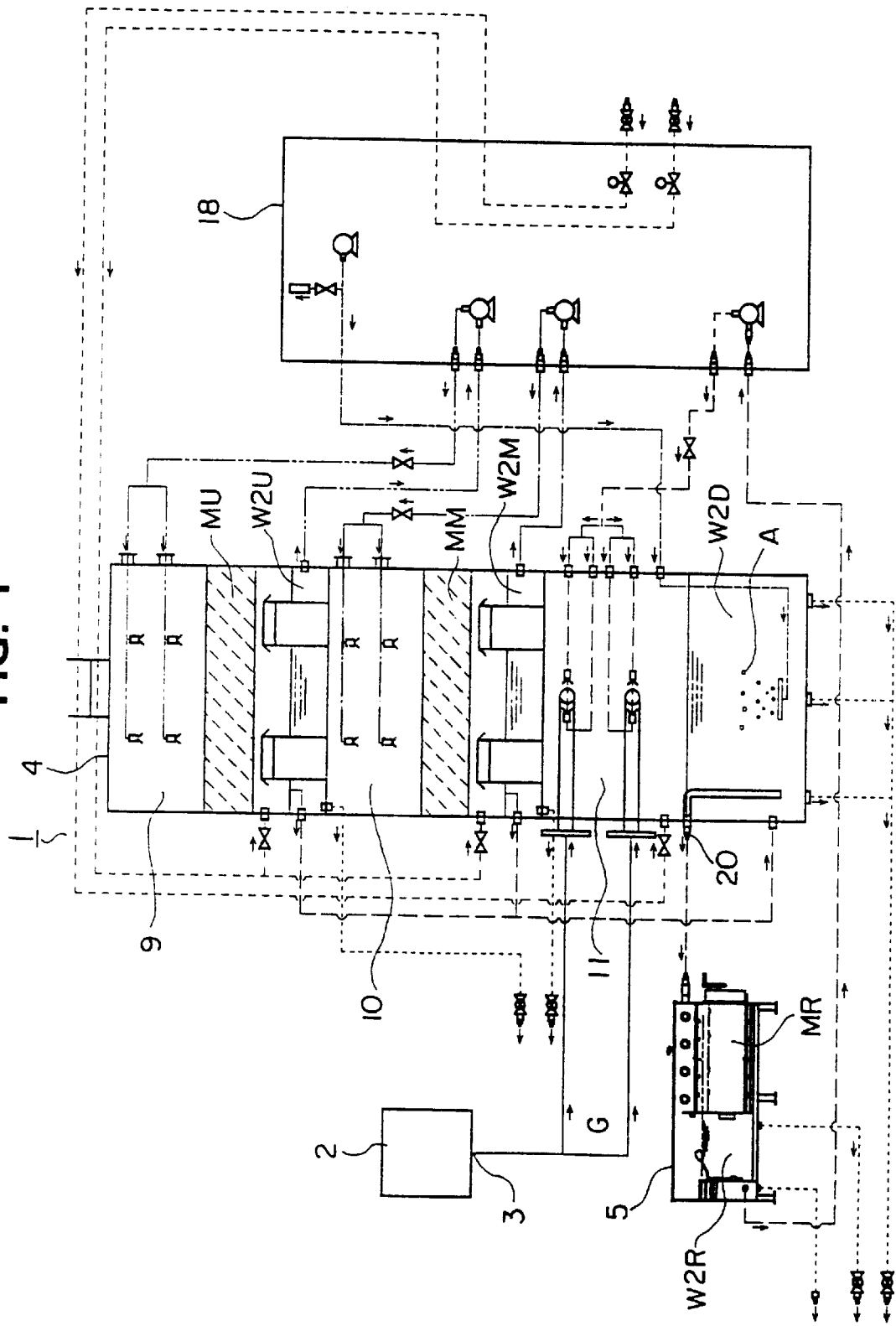
FIG. 1 is a schematic illustration of a circulatory microorganic deodorizing system according to the invention.

As shown in FIG. 1, the circulatory microorganic deodorizing system 1 according to this embodiment of the invention is linked with an exhaust gas outlet 3 for exhaust gas G from an exhaust gas generation source 2, and comprises a deodorization tower 4 and a filter cell 5.

A fermentation treatment unit for recycling organic waste is cited as an example of the exhaust gas generation source 2, and in such a fermentation treatment unit, a bio-fermentation process is applied to organic waste such as kitchen refuse sludge, animal refuse, and the like for resource recycling as organic fertilizer, soil conditioner, or the like.

The exhaust gas generation source 2 is provided with a blower for forced emission of exhaust gas G to the outside through the exhaust gas outlet 3, however, the blower may be installed at a place other than the exhaust gas generation source 2, that is, in the deodorizing system 1, or in an exhaust gas supply system GL leading to the deodorizing system 1.

Figure 2:
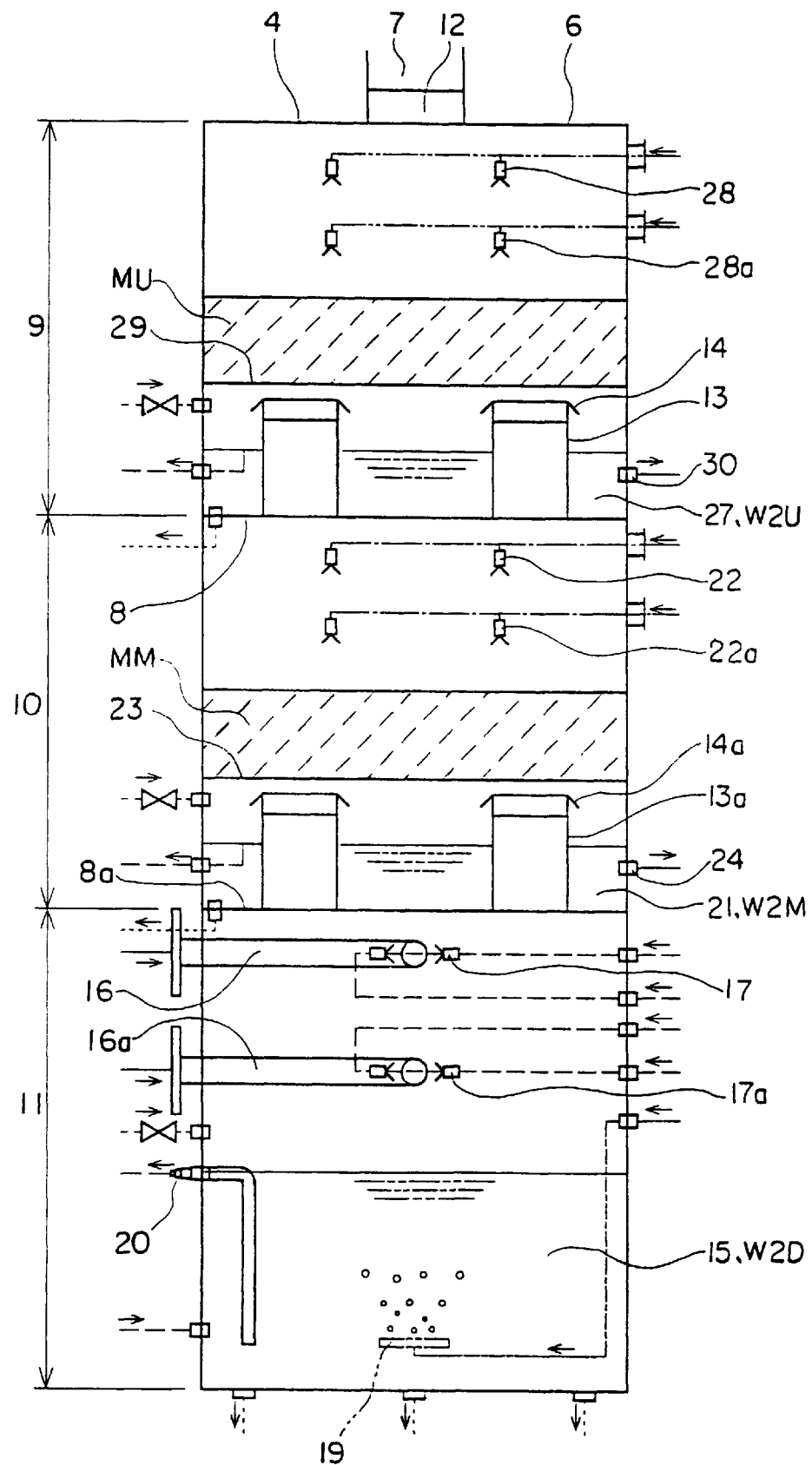
FIG. 2 is a vertical section of a deodorization tower of the circulatory microorganic deodorizing system according to the invention.

As shown in FIG. 2, the deodorization tower 4 is provided with an exhaust outlet 7 disposed on the top end of a tower main body 6 set upright, and formed in cylindrical shape with a bottom, and the inner space of the tower main body 6 is partitioned into an upper deodorization chamber 9, a middle level deodorization chamber 10, and a lower deodorization chamber 11, defined by horizontal partition walls 8, 8a, installed at two levels spaced at an adequate interval.

Inside the exhaust outlet 7 installed on the top end of the tower main body 6, a mist collector 12 is installed.

By way of example, the mist collector 12 has a structure made up of multi-layered nets composed of fine wire meshes, and the like so as to cause the flow path of passing gas to become complex.

Operation of the mist collector 12 is as follows. As opposed to gas freely passing through between the wire meshes, mist heavier than gas is unable to change the flow path thereof freely owing to the effect of inertia thereof, and moves off the flow path of gas, coming into contact with the wire meshes. Mist in contact with the wire meshes is adhered thereto owing to surface tension, and aggregated into larger particles, finally growing in size large enough to surpass updraft and surface tension while descending along the wire meshes, so as to come down in the form of droplets.

A deodorizer (not shown) filled up with activated charcoal in a gas-permeable state may be linked with the exhaust outlet 7 wherein the mist collector 12 is installed.

With such a construction, the exhaust gas G deodorized through deodorizing operation described hereinafter is emitted into the atmosphere through the deodorizer in the last stage of operation.

Activated charcoal tends to have adsorptive capacity thereof deteriorated when mist (moisture) is adsorbed thereto.

Link-ups 13, 13a, in tubular form, are installed upright on the horizontal partition walls 8, 8a, upper and lower, respectively, for linking a deodorization chamber above with a deodorization chamber below (that is, the upper deodorization chamber 9 with the middle level deodorization chamber 10 and also the middle level deodorization chamber 10 with the lower deodorization chamber 11). Covers 14, 14a are installed on the top of the link-ups 13, 13a, respectively, in such a way as to secure flow paths of gas.

With such a construction, at the time of spraying water in the upper deodorization chamber 9, and the middle level deodorization chamber 10 as described hereinafter, liquid is prevented from making direct ingress into the link-ups, 13, 13a, respectively.

Figure 5:
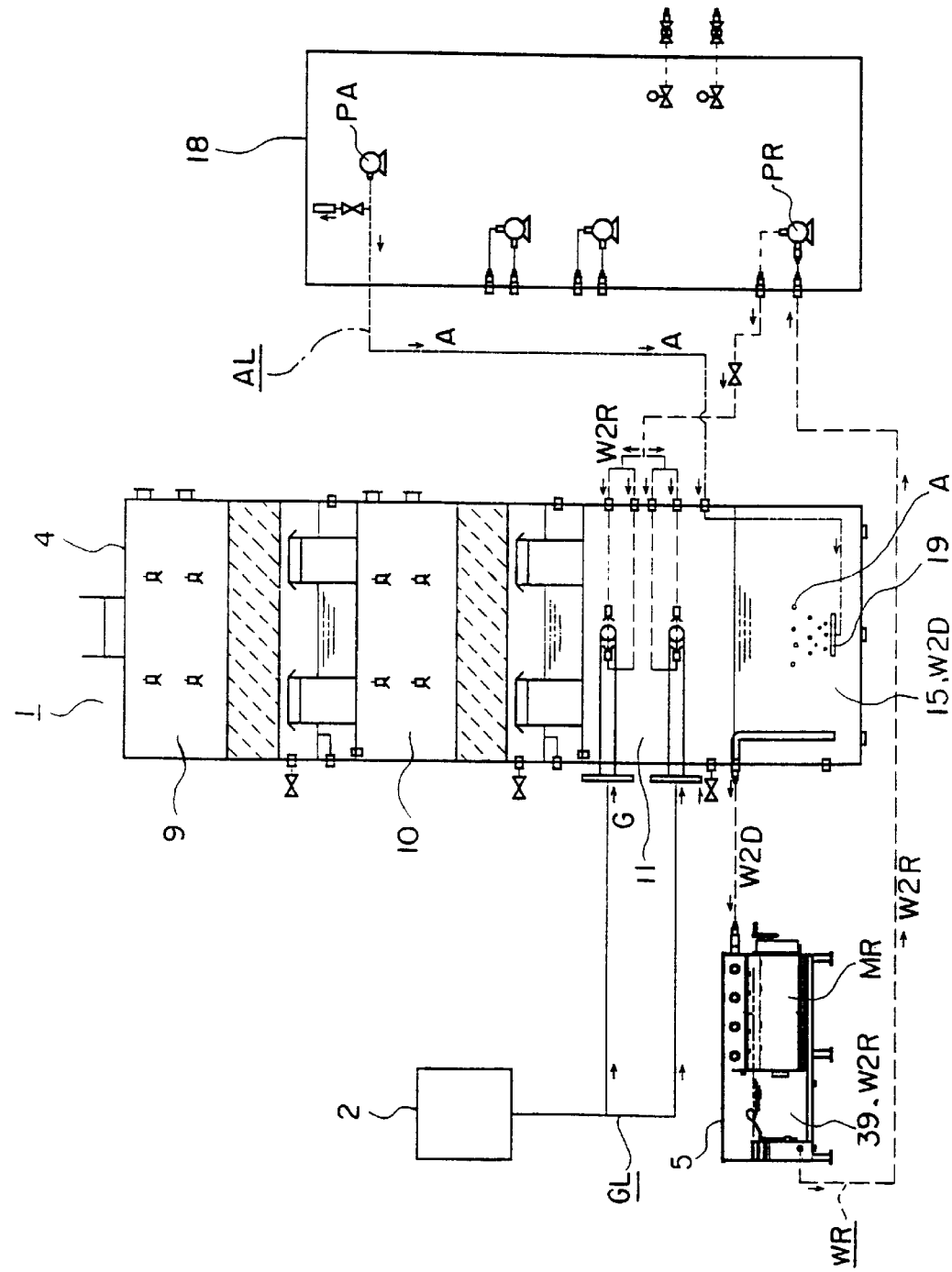
FIG. 5 is a schematic view showing a water circulation system and an exhaust gas supply system during normal operation of the circulatory microorganic deodorizing system shown in FIG. 1.

As shown in FIGS. 1, 2, and 5, a lower reservoir 15 for process water W2D is disposed in the lower part of the lower deodorization chamber 11 while exhaust gas ducts 16, 16a for feeding exhaust gas from the exhaust gas generation source 2 into the lower deodorization chamber 11 of the deodorizing system 1 are disposed in the upper part of the lower deodorization chamber 11 in such a way as to penetrate through the sidewall of the lower deodorization chamber 11.

Further, sprinklers 17, 17a, and so forth for sprinkling process water W2R (W2D) against exhaust gas G emitted from the tip port of the exhaust gas ducts 16, 16a, respectively, are installed, and disposed at a predetermined spacing from the tip port along the direction of flow of the exhaust gas G inside the exhaust gas ducts 16, 16a, respectively, while the process water W2R (W2D) from the sprinklers 17, 17a is sprinkled in filmy fashion.

With a construction described above, the exhaust gas supply system GL (in the figure, shown by the fine solid lines) for the exhaust gas G from the exhaust gas generation source 2 is made up, while making up a part of a water circulation system WR (in the figure, shown by the broken lines) for the process water W2R (W2D) to which primary processing is applied in the deodorizing system 1.

The water circulation system WR for the process water W2R and the process water W2D is made up such that the process water W2D in the lower reservoir 15 is filtered through the filter cell 5, and then showered on the exhaust gas G in the lower deodorization chamber 11 as the process water W2R, being returned thereafter to the lower reservoir 15 as described hereinafter.

Further, an air piping AL (in the figures, shown by the dash and dot line) for supplying external air A to the process water W2D in the lower reservoir 15 of the lower deodorization chamber 11 is provided, whereby, as shown in FIG. 5, a fan PA disposed inside a pump box 18 is connected to an aerator 19 disposed in the lower part of the lower reservoir 15 via piping so as to aerate the process water W2D in the lower reservoir 15 by sending the external air A onto the process water W2D.

In the water circulation system WR disposed between the lower reservoir 15 of the lower deodorization chamber 11 and the filter cell 5, a piping 20 therebetween has an inlet for the lower reservoir 15, submerged in the process water W2D in the lower reservoir 15, and an intermediate section of the piping 20 is set at an adequate height such that an outlet of the piping 20 is linked with the upper part of the filter cell 5.

With such a construction, when a water level of the process water W2D stored in the lower reservoir 15 gets up above the highest level of the piping 20, that is, when overflow above a predetermined water level occurs, a bottom portion of the process water W2D is allowed to flow into the filter cell 5.

Figure 6:
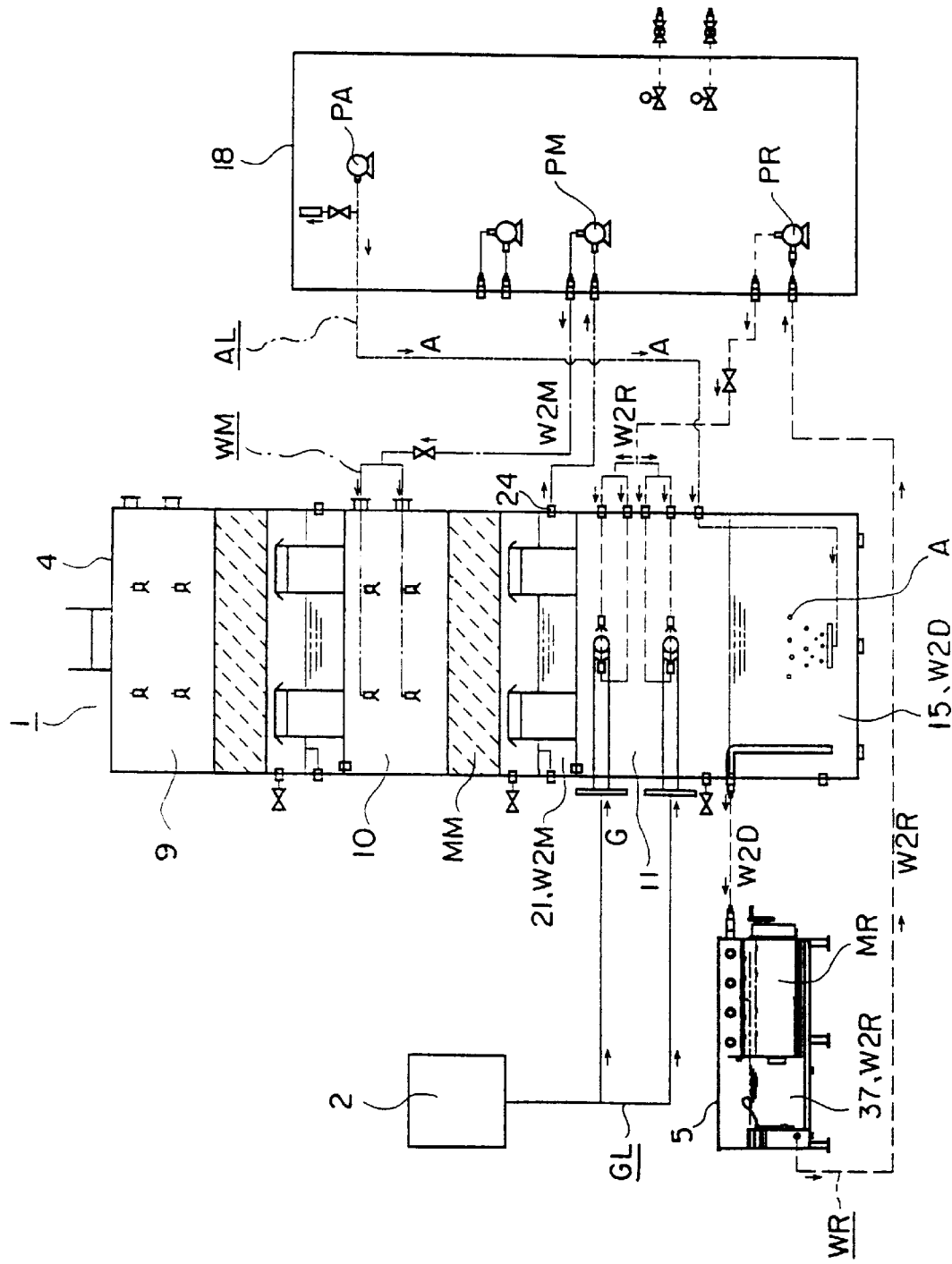
FIG. 6 is a schematic view showing a water circulation system and an exhaust gas supply system during process of washing a middle level filler in a middle level deodorization chamber while the circulatory microorganic deodorizing system shown in FIG. 1 is in normal operation.

As shown in FIGS. 1, 2, and 6, a middle level reservoir 21 for process water W2M is formed in a region lower than the top of the link-ups 13a projected upward from the horizontal partition wall 8a on the bottom of the middle level deodorization chamber 10, and spray nozzles 22, 22a for spraying the process water W2M downward in a mist-like fashion are disposed in the upper part of the middle level deodorization chamber 10.

Further, an air and water permeable partition plate 23 such as a punched plate or the like is installed at the intermediate level of the middle level deodorization chamber 10, to fill up a space above the partition plate 23 with a middle level filler MM composed of an adsorptive matter, for example, an adsorbent, and the middle level filler MM is laid throughout the surface of the partition plate 23.

A water intake 24 of a middle level spraying system WM (in the figures, shown by the dash and dot line) is disposed inside the middle level reservoir 21, and a suction piping connected to the water intake 24 is further connected to a middle level spray pump PM, and discharge piping in sequence. The tips of the discharge piping are connected to the spray nozzles 22, 22a disposed in the upper part of the middle level deodorization chamber 10.

Figure 7:
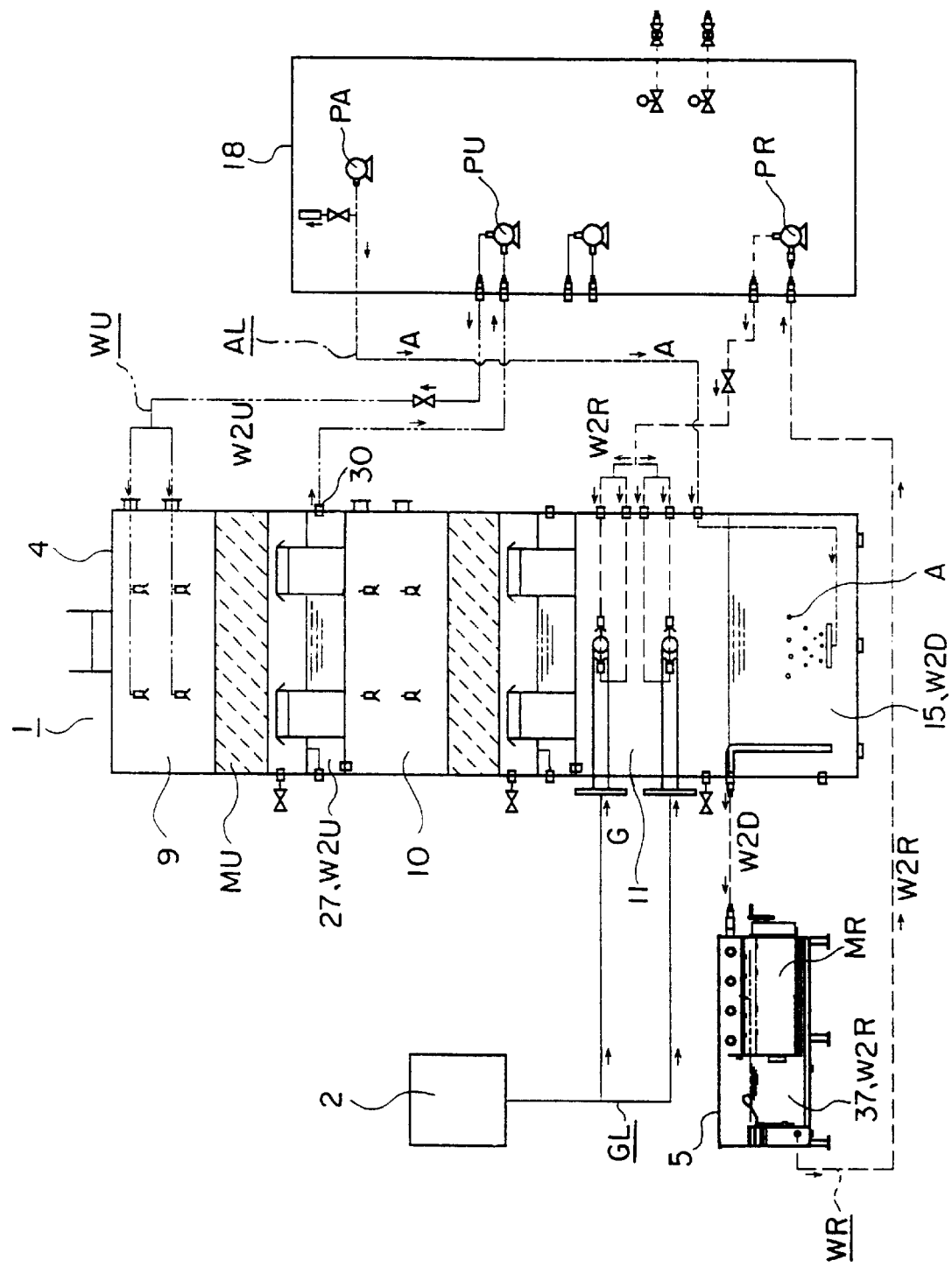
FIG. 7 is a schematic view showing a water circulation system and an exhaust gas supply system during process of washing an upper filler in an upper deodorization chamber while the circulatory microorganic deodorizing system shown in FIG. 1 is in normal operation.

As shown in FIGS. 1, 2, and 7, the upper deodorization chamber 9 has the same construction (although part names and reference numerals are different) as that of the middle level deodorization chamber 10 except that a type of an adsorbent and process water W2U, respectively, is different. More specifically, the upper deodorization chamber 9 is provided with an upper reservoir 27 for storing the process water W2U, spray nozzles 28, 28a, a partition plate 29 with an upper filler MU composed of adsorptive adsorbents laid thereon, and an upper spraying system WU (in the figures, shown by the dash and double-dots line).made up of a water intake 30, suction piping, discharge piping, and an upper spray pump PU.

The upper filler MU composed of adsorbents filling up a portion of the upper deodorization chamber 9 is made by mixing soil sedimented over weathered sedimentary layer of volcanic ejecta such as Kuroboku soil, pulverized earth and sand, volcanic ash, and the like with "roasted" charcoal produced by the destructive distillation of rice hulls in a covered vessel, and subsequently, by granulating a mixture after adding a binder thereto.

The roasted charcoal is an adsorptive and porous matter in an intermediate state between activated charcoal and natural organic matters, containing effective constituents to serve as sources of nutrition supply for microorganisms.

The middle level filler MM filled in the middle level deodorization chamber 10 and composed of adsorbents is a porous matter in sintered granules, composed mainly of cristobalite, a type of silicic acid anhydride, as its main constituent, and small amounts of quartz, tridymite, chlorite, illite, montmorillonite, and the like, having property of holding microorganisms with ease after microorganisms are adsorbed and adhered thereto, that is, a high supporting capacity because the adsorbents have pores as large as 100 Å in average diameter.

Further, activated sludge bacteria are mixed into the process water W2U, and W2M, filling up the upper reservoir 27, and the middle level reservoir 21, respectively, while photosynthetic bacteria, aerobic and capable of reducing high load BOD (biochemical oxygen demand) are mixed into the process water W2D filling up the lower reservoir 15 in the lower deodorization chamber 11.

Figure 8:
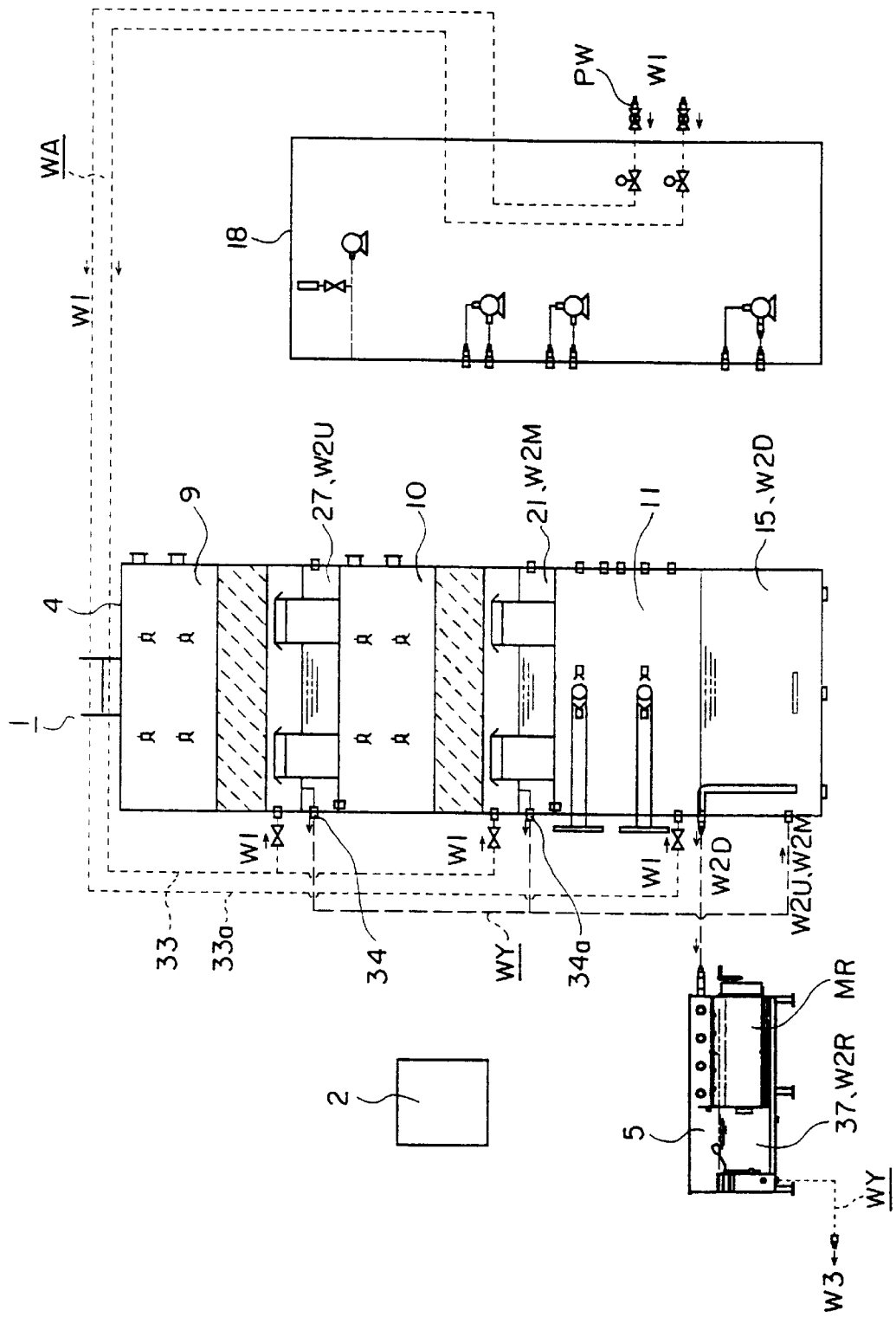
FIG. 8 is a schematic view showing a water supply system for supplying neutral supply water to an upper deodorization chamber, a middle level deodorization chamber, and a lower deodorization chamber, and a drainage system for draining excess of process water from the upper deodorization chamber, the middle level deodorization chamber, and the lower deodorization chamber through the filter cell.

As shown in FIGS. 1, 2, and 8, a water supply system WA (in FIG. 8, shown by the broken lines) for supplying neutral supply water W1 intermittently as necessary for use as the process water W2U, W2M, and W2D, respectively, to the upper reservoir 27, the middle level reservoir 21, and the lower reservoir 15, respectively, of the upper deodorization chamber 9, the middle level deodorization chamber 10, and the lower deodorization chamber 11, respectively, is installed. The water supply system WA comprises a water supply source PW, water supply piping 33, 33a, and so forth.

The process water W2M, and W2U, stored in the middle level reservoir 21, and the upper reservoir 27, respectively, are maintained at predetermined water levels, and overflow piping 34, 34a of a drainage system WY (in FIG. 8, shown by the broken lines) are installed to drain out overflowing portions of the process water W2U, and W2M, connecting downstream outlets thereof to the lower reservoir 15 in the lower deodorization chamber 11.

It is preferable to dispose the downstream outlet of the overflow piping 34, 34a, respectively, for draining excess of the process water W2M, and W2U out of the middle level deodorization chamber 10, and the upper deodorization chamber 9, respectively, within the process water W2D.

The reason for this is that although the exhaust gas G flowing into the lower deodorization chamber 11 from the exhaust gas generation source 2 ascends to the middle level deodorization chamber 10, and the upper deodorization chamber 9, accompanied by pressure drop, the exhaust gas G inside the middle level deodorization chamber 10 and the upper deodorization chamber 9 is still pressurized, and since excess water coming down through the overflow piping 34, 34a is overflowing supernatant fluid, the overflow piping 34, 34a are not filled up so that there is a risk of the exhaust gas G in the lower deodorization chamber 11 ascending therethrough, or the exhaust gas G in the middle level deodorization chamber 10 and the upper deodorization chamber 9 being emitted out of the overflow piping 34, 34a into the atmosphere.

Further, the downstream outlet of the overflow piping 34, 34a is linked with the lower reservoir 15 of the lower deodorization chamber 11, but may be disposed within the process water W2R in the filter cell 5 instead.

Next, the water circulation system WR comprising the lower reservoir 15 provided in the deodorization tower 4, as one of main components thereof, is described in whole hereinafter.

That is, with reference to the process water W2D of the lower reservoir 15 and the process water W2R of the filter cell 5, the latter is sprayed on the exhaust gas G and circulated while the former is sent out from the lower reservoir 15 to the filter cell 5, as described in the foregoing. The filter cell 5 and the water circulation system WR, including the above, will be described in detail hereinafter.

Figure 3:
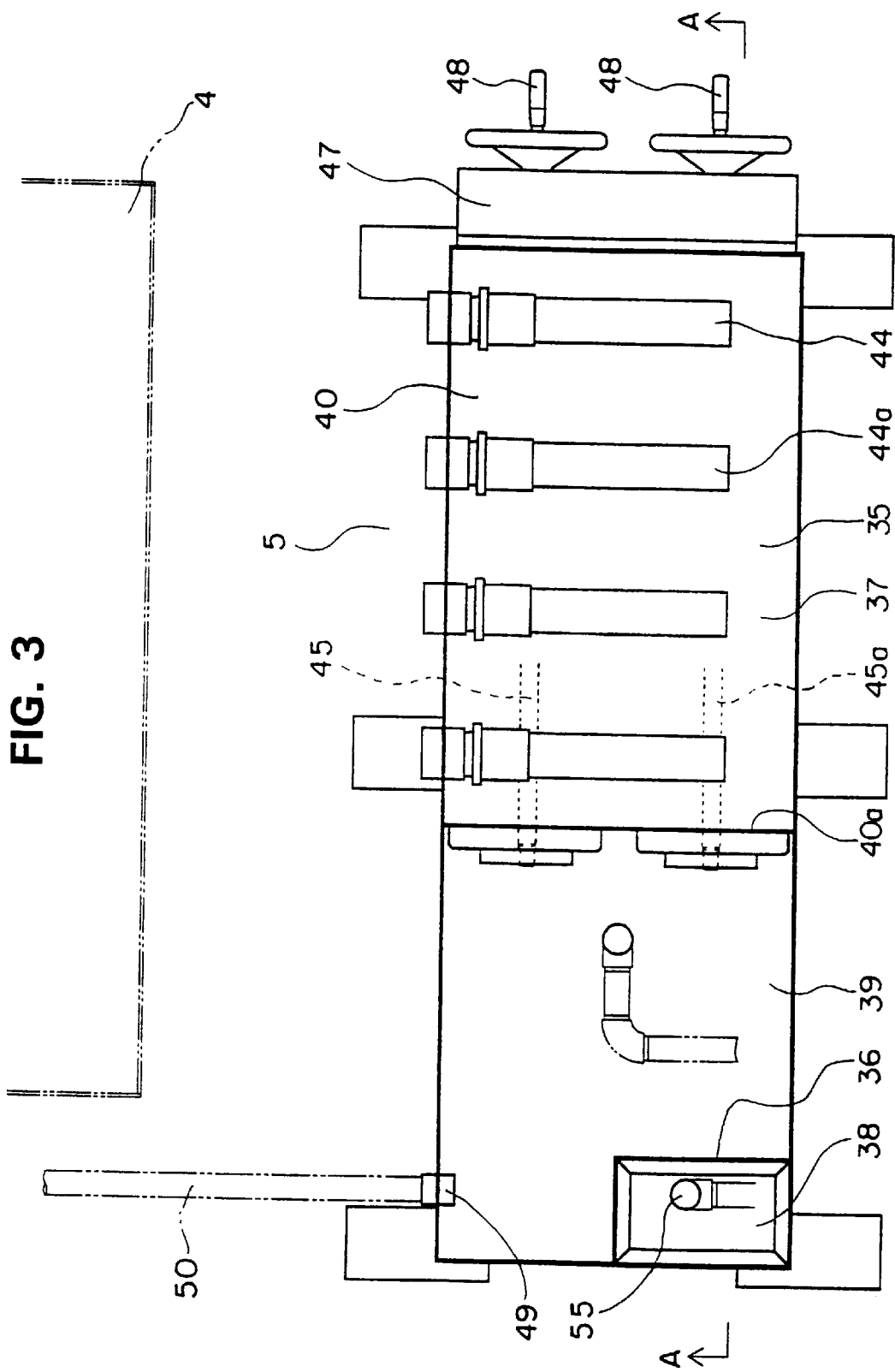
FIG. 3 is a plan view of a filter cell of the circulatory microorganic deodorizing system according to the invention.
Figure 4:
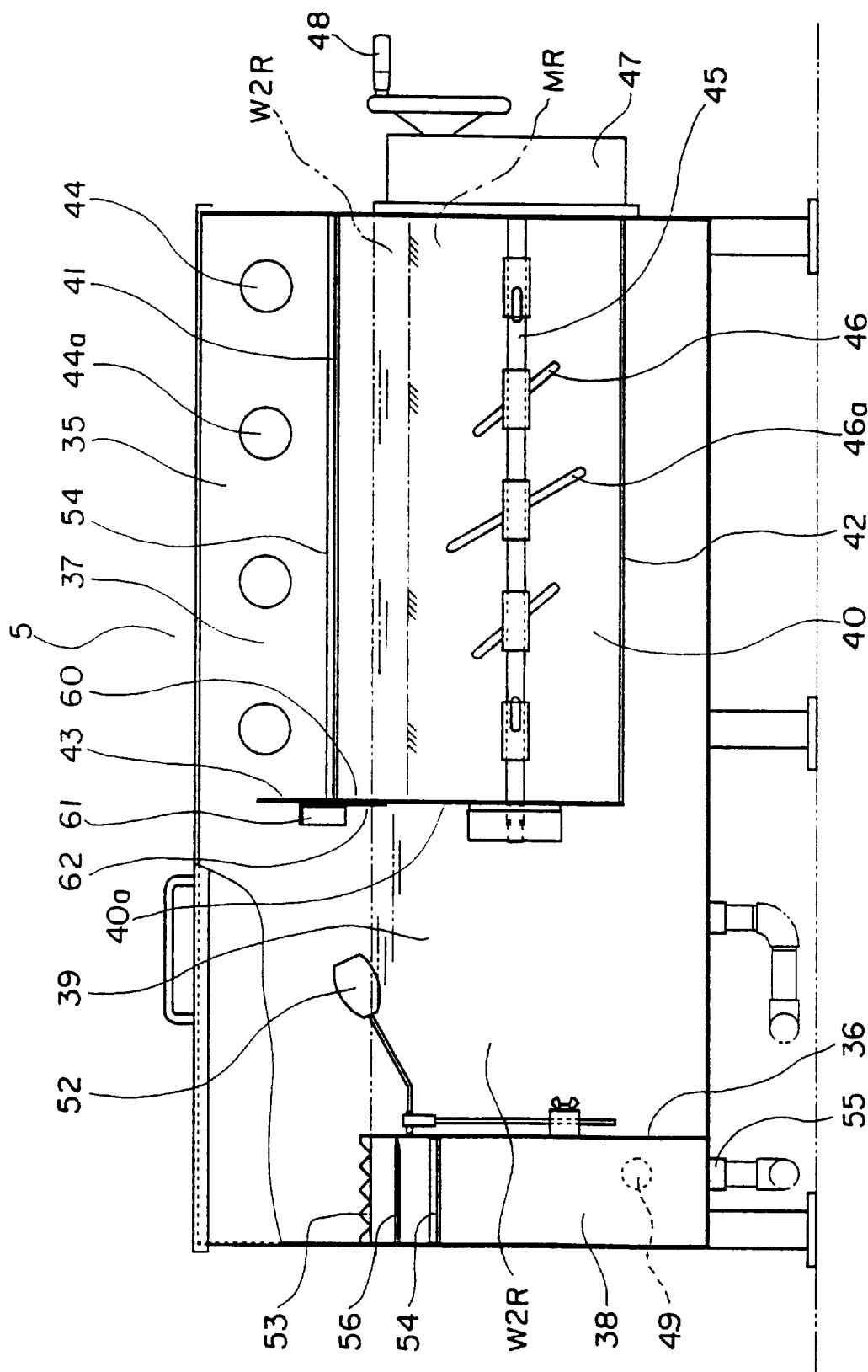
FIG. 4 is a sectional view taken along the line A—A of FIG. 3.

As shown in FIGS. 1, 3, and 4, the filter cell 5 is partitioned by a partition wall 36 set upright in a cell main body 35 formed in box shape, defining a filter section 37 and a discharge section 38, and a filtering box 40 is installed in a semi-submerged condition in a region of a filtering and water storage part 39 of the filter section 37.

A top plate 41 and a bottom plate 42 of the filtering box 40 are formed of a perforated material such as a punched metal, and a space over the bottom plate 42 inside the filtering box 40 is filled up with a filtering filler MR composed of an adsorbent having the same adsorbability as that of the middle level filler MM.

Space above the filtering box 40 and the filtering and water storage part 39 is partitioned by a partition plate 43 set upright on top of a sidewall plate 40a of the filtering box 40, and sprinkling pipes 44, 44a, and so forth are horizontally installed above the filtering box 40, connecting an inlet of the sprinkling pipes 44, 44a, and so forth, respectively, to the piping 20 leading to the lower deodorization chamber 11.

A filter 54 of the same type as a filter installed in the discharge section 38 is installed on the top plate 41 of the filtering box 40.

Further, stirring axles 45, 45a are freely rotatably installed in the filtering box 40 filled up with the filtering filler MR, and stirring bars 46, 46a, and so forth are attached to strategic points of each of the stirring axles 45, 45a while handles 48, 48a for rotating the stirring axles 45, 45a via an interlocking device 47 are installed.

With such stirring means, the filtering filler MR in the filtering box 40 is freely stirred up manually.

The stirring means whereby the stirring axles 45, 45a are freely rotatable is described as above by way of example, but means whereby the stirring axles 45, 45a, respectively, is freely transferable in orientation as well as freely rotatable, or other means may be adopted.

A circulatory pump PR of the water circulation system WR has the suction side thereof connected via a piping 50 to a water outlet 49, bored in the sidewall of the cell main body 35 of the filter cell 5, and disposed slightly above the bottom thereof, and the discharge side thereof connected via a piping to the sprinklers 17, 17a disposed in close proximity of the exhaust gas ducts 16, 16a through which the exhaust gas G is sent into the lower deodorization chamber 11.

A float switch 52 is provided on the filtering and water storage part 39 side of the partition wall 36 so as to be able to exercise control the water supply system WA.

The discharge section 38 of the filter cell 5 is provided with a discharge port 53, made up of a plurality of overflow orifices in the shape of an inverted triangle, formed by combining triangle dikes, at the upper end of the partition wall 36 thereof, and a SS mat for removing SS (smut) and the filter (mesh) 54, in the intermediate part thereof, while a drainage outlet 55 of a discharge system WR (in FIG. 8, shown by the broken line) on the underside thereof.

Further, a flow guide plate 56 for guiding the process water W2R overflowing from the discharge port 53 and flowing down towards the center of the filter 54 is installed between the discharge port 53 and the filter 54.

With such a construction, the discharge port 53 allows supernatant liquid to be discharged from the filtering and water storage part 39 to the discharge section 38 depending on a water level of the process water W2R in the filtering and water storage part 39, and also by letting an increased portion of the process water W2R pass through the discharge port 53 in case of a sudden rise in the water level since the discharge port 53 is made up of the overflow orifices in the shape of an inverted triangle.

Figure 9:
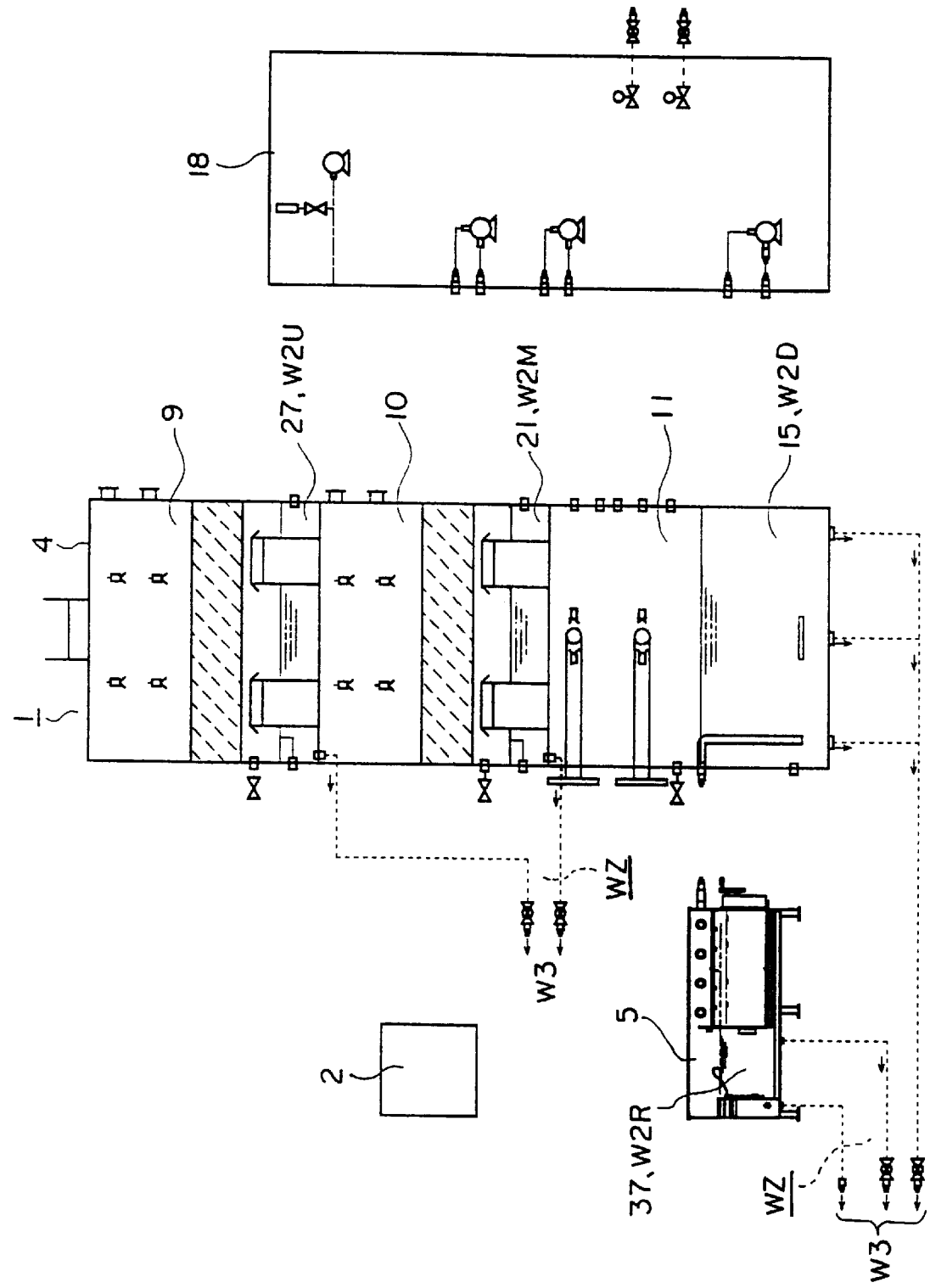
FIG. 9 is a schematic view showing the circulatory microorganic deodorizing system with water drained out when out of operation over a long period of time.
Figure 10:
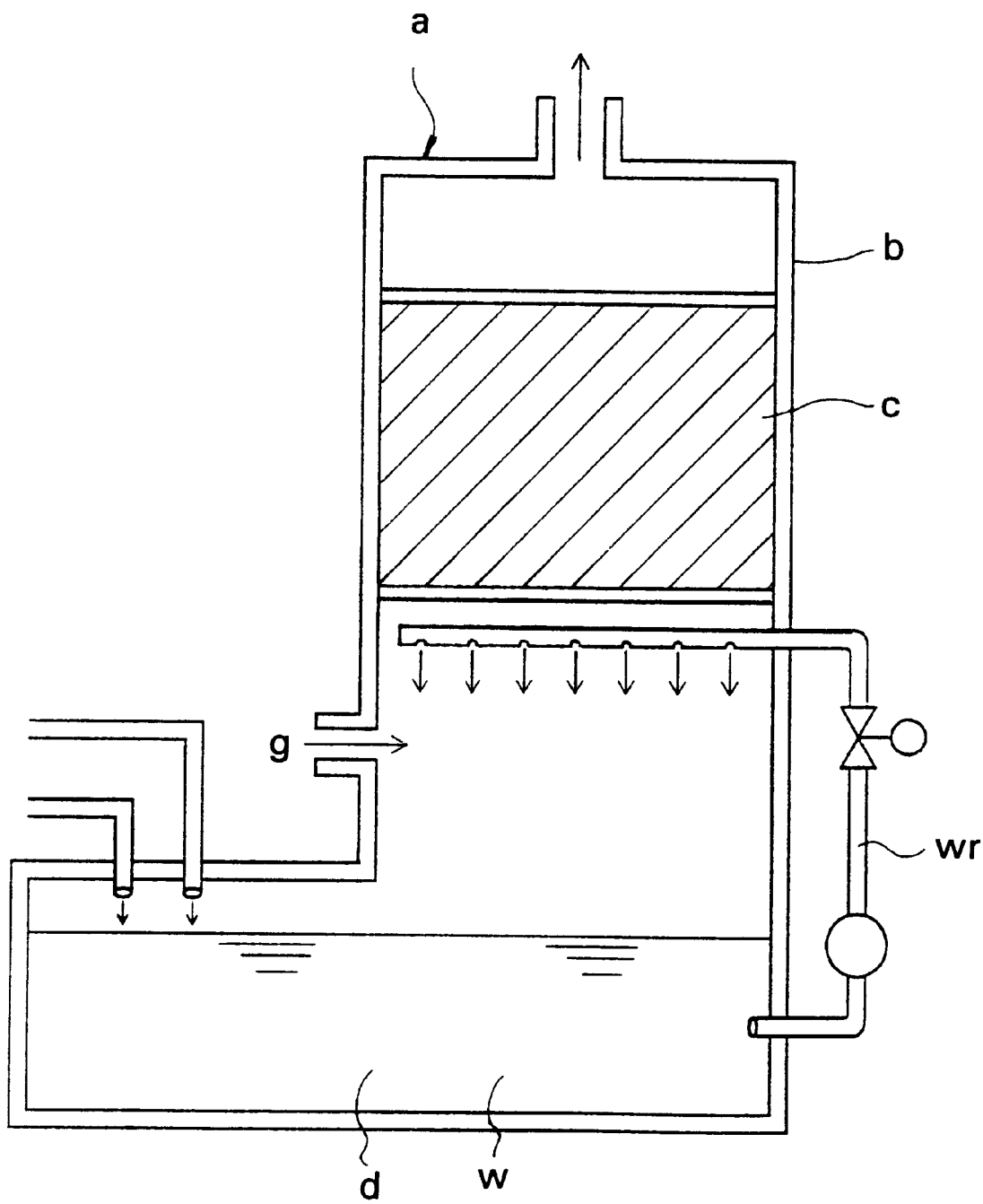
FIG. 10 is a schematic vertical section of a conventional deodorizing system.

As shown in FIG. 9, the upper deodorization chamber 9, the middle level deodorization chamber 10, the lower deodorization chamber 11, and the filter cell 5 are connected with a drainage system WR (in the figure, shown by the broken lines) for draining all of the process water W2D, W2M, W2U, and W2R out as drained water W3 when operation is stopped.

Each of the deodorization chambers is provided with a window for natural lighting, an open/close door for use in operation, and a port for feeding microorganisms into the process water W2D, W2M, and W2U, respectively.

The system is also provided with countermeasures required for cold regions by installing heaters and thermistors (thermocouples) at various locations to prevent freezing of the process water W2D, W2M, W2U, and W2R, and by use of a heat insulating materiel for preventing slowdown in the activity of microorganisms.

Now, operation of the circulatory microorganic deodorizing system according to the invention is described hereinafter.

When the exhaust gas G at high temperature forcibly supplied from the exhaust gas generation source 2 connected to the exhaust gas ducts 16, 16a with the use of the blower is delivered into the lower deodorization chamber 11 through the tip port of the exhaust gas ducts 16, 16a, respectively, the exhaust gas G comes in contact with the process water W2R in the course of the exhaust gas G passing through the process water W2R in a filmy condition as sprinkled from the sprinklers 17, 17a, and so forth.

While the exhaust gas G is cooled down and fed into the lower deodorization chamber 11, dust and water soluble offensive odor constituents having hydrophilic acidic groups such as ammonia, amine, hydrogen sulfide, formaldehyde, lower organic acids, and the like, which are contained in the exhaust gas G, are dissolved into and absorbed by the process water W2R sprinkled (primary processing), and flows down into the process water W2D in the lower reservoir 15, with photosynthetic bacteria mixed therein so that organic matter such as dust and the water soluble offensive odor constituents as described in the foregoing are decomposed and removed by the photosynthetic bacteria (fourth processing).

Subsequently, the process water W2D flows down to the filter cell 5 for final (fifth) processing.

While portions of dust and the water soluble offensive odor constituents are removed in the lower deodorization chamber 11, the exhaust gas G substantially at room temperature after cooled down is fed into the middle level deodorization chamber 10 under pressure from the exhaust gas generation source 2 through the link-ups 13a, passing through the middle level filler MM filling up a portion of the middle level deodorization chamber 10.

In the process of the exhaust gas G passing therethrough, residual offensive odor constituents of the exhaust gas G are removed (secondary processing) by adsorption with the middle level filler MM (adsorbent), and simultaneous decomposition by the agency of sludge bacteria supported (adsorbed, and held through adherence) by the middle level filler MM.

Thereafter, the exhaust gas G from which portions of the offensive odor constituents are removed in the middle level deodorization chamber 10 is fed into the upper deodorization chamber 9 through the link-ups 13, passing through the upper filler MU filling up a portion of the upper deodorization chamber 9.

In the process of the exhaust gas G passing therethrough, residual offensive odor constituents of the exhaust gas G are removed (tertiary processing) by adsorption with the upper filler MU (adsorbent), and simultaneous decomposition by the agency of sludge bacteria supported (adsorbed, and held through adherence) by the upper filler MU.

Deodorized exhaust gas G with mist thereof removed, when passing through the mist collector 12 disposed inside the exhaust outlet 7, is finally discharged externally through the exhaust outlet 7.

In the case where the deodorizer with activated charcoal housed therein is linked with the exhaust outlet 7, the deodorized exhaust gas G with mist removed is completely deodorized.

Now, operation of adsorbing, decomposing, and removing the offensive odor constituents of the exhaust gas G with the adsorbent (the middle level filler MM, and the upper filler MU), and by the agency of the activated sludge bacteria, in the middle level deodorization chamber 10 and the upper deodorization chamber 9, respectively, is described in detail hereinafter.

First, in the course of the exhaust gas G in a pressurized condition ascending from the lower deodorization chamber 11 and passing through the middle level filler MM (adsorbent) inside the middle level deodorization chamber 10, accompanied by a loss in pressure, the offensive odor constituents of the exhaust gas G are adsorbed by and adhered to pores and the surface of the adsorbent.

Further, since activated sludge bacteria are supported by the pores of the middle level filler MM as a result of sprinkling of the process water W2M, the offensive odor constituents adsorbed by the pores of the adsorbent are decomposed by the agency of the activated sludge bacteria (secondary processing).

Subsequently, when the exhaust gas G ascending from the lower deodorization chamber 11 to the upper deodorization chamber 9, and subjected to the primary processing in the lower deodorization chamber 11 and to the secondary processing in the middle level deodorization chamber 10 is passing through the upper filler MU (adsorbent), the offensive odor constituents thereof are adsorbed by and adhered to pores, the surface, and so forth of the adsorbent.

Since activated sludge bacteria are supported by the pores, and so forth of the upper filler MU as a result of sprinkling of the process water W2U, the offensive odor constituents adsorbed by the pores, and so forth of the adsorbent are decomposed by the agency of the activated sludge bacteria (tertiary processing).

The secondary processing and the tertiary processing, applied in the middle level deodorization chamber 10 and the upper deodorization chamber 9, respectively, are basically the same, however, there is a difference therebetween, which will be described hereinafter.

The difference between the adsorbent filled in the middle level deodorization chamber 10 and same filled in the upper deodorization chamber 9 is that the middle level filler MM of the middle level deodorization chamber 10 has higher adsorptive capacity due to higher porosity thereof while the upper filler MU of the upper deodorization chamber 9 has higher decomposition capacity.

The mechanism of deodorization is described in detail hereinafter by comparing further such actions as described with each other.

The offensive odor constituents of the exhaust gas G flowing into the middle level deodorization chamber 10 are first adsorbed and held back by the adsorbent having high adsorptive capacity, and subsequently, decomposed by the activated sludge bacteria.

Since the upper filler MU filled in the upper deodorization chamber 9 has lower adsorptive capacity in comparison with the middle level filler MM filled in the middle level deodorization chamber 10, but is composed of a variety of matters, residual offensive odor constituents of the exhaust gas G are adsorbed to pores of the matters, and gaps between the matters, and adhered to the surfaces of the matters, thus being separated from the exhaust gas G and adsorbed to the upper filler MU.

Further, the upper filler MU filled in the upper deodorization chamber 9 has high water holding power and abounds in sources of nutrition supply for microorganisms, enabling bacteria and microorganisms therein to have high reproductivity, and in addition, the upper filler MU has higher capacity of decomposing the residual offensive odor constituents (deodorizing capacity) because of a larger number of bacteria existing therein due to a smaller number of bacteria being dropped by sprinkling of water so that adsorption and decomposition can proceed simultaneously.

Furthermore, the difference in the action of the adsorbent between the middle level deodorization chamber 10 and the upper deodorization chamber 9 as described above has bearing on cleansing of the adsorbents, described later, besides the deodorizing capacity.

The intensity of offensive odor of the exhaust gas G fed from the exhaust gas generation source 2 into the deodorizing system 1 varies because, for example, organic waste dumped into the exhaust gas generation source 2 vary in type from time to time, or a large quantity of organic waste is dumped at a time at some intervals of time.

When the exhaust gas G having an intensely offensive odor is fed into the lower deodorization chamber 11 of the deodorization tower 4, the exhaust gas G, even after the primary processing applied in the lower deodorization chamber 11, has a stronger odor than at normal times, but the exhaust gas G after ascending into the middle level deodorization chamber 10 is adsorbed by the middle level filler MM, and deodorized, reducing magnitude of an increase in the offensive odor constituents of the exhaust gas G ascending into the upper deodorization chamber 9.

Thus, a temporary increase in the magnitude of the offensive odor constituents can be coped with by decomposition thereof with bacteria, and the like in the middle level deodorization chamber 10 and the upper deodorization chamber 9, and also by the high adsorptive capacity of the middle level filler MM in the middle level deodorization chamber 10.

When offensive odor of the exhaust gas G becomes intense with an increase in the offensive odor constituents thereof, there will be a temporary increase in the number of bacteria mainly in the middle level deodorization chamber 10 since the offensive odor constituents are sources of nutrition supply for bacteria at times of normal operation, and as decomposition of the offensive odor constituents proceeds and the adsorptive capacity is restored, accompanied by a decrease in the offensive odor constituents, a decrease in the number of bacteria takes place behindhand.

The magnitude of an increase or a decrease in the adsorptive capacity, the number of bacteria, and the decomposition capacity of the upper deodorization chamber 9 is relatively small because an increase or a decrease in the offensive odor constituents thereof is mitigated by the action of the middle level deodorization chamber 10 interposed between the upper deodorization chamber 9 and the lower deodorization chamber 11.

Now that the purposes and actions of two types of the adsorbents filled in the respective deodorization chambers are brought to light as described above, further description is given hereinafter with reference to vertical relation therebwteeen.

In view of the functions of the respective adsorbents, it is easier to enhance deodorization efficiency by disposing the upper filler MU finally at the uppermost level (on the downstream side) because the upper filler MU of the upper deodorization chamber 9 has a higher deodorizing capacity.

A second reason for disposing the upper filler MU at the uppermost level is because the upper filler MU is formed by granulating various constituents after bonding same together with binders, and as the binders are susceptible to the effect of heat, the upper filler MU is disposed on the downstream side.

That is, since the exhaust gas G is gradually cooled down in the stage of the secondary processing applied in the middle level deodorization chamber 10, degradation in efficacy of the binders due to the effect of heat does not occur, preventing disintegration of a layer of the upper filler MU.

In case the disintegration of the layer of the upper filler MU occurs, the water holding capacity of the upper filler MU containing soil composed mainly of volcanic ash deteriorates due to outflow of the soil, lowering the reproductivity of bacteria.

Further, since bacteria and the like tend to be more activated at lower temperatures, an environment suited for reproduction of bacteria (condition having sources of nutrition supply) is established in the upper deodorization chamber 9 where the exhaust gas G is cooled to a relatively low temperature in order to maintain and enhance the deodorizing capacity of the deodorizing system 1.

When the secondary processing, and the tertiary processing are applied in the middle level deodorization chamber 10, and the upper deodorization chamber 9, respectively, sulfides and a biofilm mainly composed of carcasses of microorganisms are adhered to the surface, pores, and so forth of the adsorbents, deteriorating adsorptive and decomposition capacity of the deodorizing system 1, and setting back activation of bacteria due to an acidic atmosphere created by the agency of lower pH caused by ions of sulfuric acid.

To cope with the situation described, the process water W2U, and the process water W2M, filled in the upper reservoir 27, and the middle level reservoir 21, respectively, and with the activated sludge bacteria mixed therein, are sprayed periodically onto the upper filler MU, and the middle level filler MM, respectively, from the spray nozzles 28, 28a, provided in the upper deodorization chamber 9, and the spray nozzles 22, 22a, provided in the middle level deodorization chamber 10, respectively, via the upper spray pump PU and the middle level spray pump PM, respectively.

The biofilm is washed off the upper filler MU, and the middle level filler MM, respectively, by such spraying, and pores in clogged condition are restored to original condition thereof, enabling the adsorbents to regain adsorptive capacity thereof.

In the course of such washing, a small amount of microorganisms and the like drop, however, an extent to which bacteria drop by spraying in the upper deodorization chamber 9 differs from same in the middle level deodorization chamber 10.

More specifically, in the middle level deodorization chamber 10, adsorptive capacity is restored through washing by spraying after build-up of the biofilm, but decomposition capacity is temporarily lowered due to a decrease in the number of bacteria while in the upper deodorization chamber 9, an extent to which the number of bacteria decreases is smaller, thus minimizing deterioration in the decomposition capacity.

This is yet another reason why two types of the adsorbents are in use for the deodorizing system 1 according to invention.

Water spraying has a basic purpose of cleansing the adsorbents and adjusting pH, but it has another purpose in the upper deodorization chamber 9 as follows.

That is, the upper filler MU abounds in sources of nutrition supply, maintaining an environment suited for propagation of bacteria, and also has water holding capacity. Accordingly, improvement of the environment for microorganisms is achieved by the agency of the upper filler MU capable of containing and holding water through spraying of the process water W2U thereon by operation of the upper spraying system WU.

Further, the middle level spraying system WM and the upper spraying system WU are also used prior to the initial stage of operation of the deodorizing system 1 for the respective adsorbents to support the activated sludge bacteria mixed in the process water W2M, and W2U, respectively, by causing the bacteria to be adsorbed and adhered to the respective adsorbents, and to be propagated therein.

Furthermore, when deodorization operation is underway, ions of sulfuric acid produced through reaction mechanism of the activated bacteria at the time of deodorization build up in the adsorbents, lowering pH thereof (acidified) and, inhibiting deodorizing reaction of microorganisms. For this reason as well, water spraying is used to wash the ions of sulfuric acid off the adsorbents by the process water W2M, and W2U.

Since the process water W2U, and the process water W2M, filled in the upper reservoir 27, and the middle level reservoir 21, respectively, are recycled, repeated cleansing of the upper filler MU and the middle level filler MM leads to lowering of pH for the process water W2U and the process water W2M in the upper reservoir 27, and the middle level reservoir 21, respectively, acidifying both the process water.

Accordingly, the neutral supply water W1 is periodically supplied from the water supply piping 33, 33a to adjust pH of the process water W2U and the process water W2M, respectively, by dilution thereof while excess of the process water W2U and the process water W2M is delivered to the lower reservoir 15 in the lower deodorization chamber 11 via the overflow piping 34, 34a.

As a result of the process water W2U and the process water W2M in the upper reservoir 27, and the middle level reservoir 21, respectively, overflowing into the lower reservoir 15 in the lower deodorization chamber 11 as well as the water soluble offensive odor constituents of the exhaust gas G being dissolved therein, a pH value of the process water W2D in the lower deodorization chamber 11 is gradually lowered. Accordingly, the neutral supply water W1 is periodically supplied via the water supply piping 33, 33a to adjust the pH value of the process water W2D by dilution thereof.

By the agency of the photosynthetic bacteria mixed in the process water W2D, and the activated sludge bacteria mixed in the process water W2U, and W2M, flowing down from the upper deodorization chamber 9, and the middle level deodorization chamber 10, organic matters in dust and the offensive odor constituents dissolved are microbiologically decomposed (cleansing of contaminated water) in the lower reservoir 15 while providing aeration (fourth processing).

The process water W2D containing residual organic matters, and residual water soluble offensive odor constituents is delivered to the inlet of the filter section 37 of the filter cell 5 via the piping 20 of the water circulation system WR after the fourth processing applied in the lower reservoir 15.

In the process of the process water W2D passing through the filtering filler MR filled in the filter section 37, the residual offensive odor constituents, and so forth are removed through actions of adsorption by the adsorbents and decomposition by the activated sludge bacteria and the photosynthetic bacteria, supported by the adsorbents, proceeding simultaneously.

The process water W2R is sprinkled from the sprinklers 17, 17a, and so forth, disposed in the lower deodorization chamber 11, by driving the circulatory pump PR (the primary processing of the exhaust gas G), and then returned to the lower reservoir 15.

As a result of operation in the filter cell 5, whereby the residual offensive odor constituents, and so forth, contained in the process water W2D, are adsorbed and decomposed, a biofilm is formed on the filtering filler MR as well, requiring rehabilitation of the filtering filler MR.

Accordingly, the stirring axles 45, 45a are rotated by manipulating the handles 48, 48a so as to stir up the filtering filler MR with the stirring bars 46, 46a, and so forth, fixedly attached to the stirring axles 45, 45a, and the biofilm adhered to the surface of the filtering filler MR is peeled off due to mutual contact friction between the adsorbents composing the filtering filler MR, causing the biofilm to drop through perforations of the bottom plate 42 of the filtering box 40 filled up with the filtering filler MR. The filtering filler MR is thus rehabilitated.

As shown in FIG. 4, a release port 60 is opened in the upper part of a sidewall plate 40a of the filtering box 40, corresponding to the water level of the process water W2R, and a sliding block plate holder 61 is also provided in the upper part of the sidewall plate 40a in such a way as to hold a sliding block plate 62 slidably up and down on the outer surface of the sidewall plate 40a.

With such a construction, a condition allowing supernatant fluid of the process water W2R to be freely passable in the upper part of the filtering box 40 between the filtering box 40 and the filtering and water storage part 39 is established by sliding the sliding block plate 62 up.

Although the majority of the biofilm is peeled off when the filtering filler MR is stirred up as described above, and dropped through the bottom plate 42, part thereof is floated in the process water W2R, and when a large quantity of suspended particles build up in the filtering box 40 after use of the deodorizing system 1 over a long period of time, the suspended particles are released into the filtering and water storage part 39 by sliding the sliding block plate 62 up, and finally recovered by the filter 54 of the discharge section 38, ensuring continuity in rehabilitating capacity of the filtering box 40.

The neutral supply water W1 is fed into the upper reservoir 27, the middle level reservoir 21, and the lower reservoir 15, respectively, via the water supply piping 33, 33a, generating excess of the process water W2D, W2R, which flows into the filtering and water storage part 39, whereupon supernatant fluid of the process water W2R in the filtering and water storage part 39 of the filter section 37 flows into the discharge section 38 through the discharge port 53 of the filter section 37, and then discharged externally through the drainage outlet 55 of the discharge section 38.

External discharge of excess of the process water W2D, W2R other than that resulting from supply of the neutral supply water W1 is regularly carried out as follows.

That is, since the exhaust gas G fed from the exhaust gas generation source 2 contains moisture such as water vapor, the moisture in the exhaust gas G is mixed with the process water W2D through showering done in the stage of the primary processing immediately after flowing of the exhaust gas G into the deodorizing system 1, and consequently, a quantity of the process water W2D is constantly on the increase. As a result, excess of the process water W2R is constantly discharged and drained.

The neutral supply water W1 is supplied so as to enable observation of a drainage standard, discharging excess of the process water W2R after dilution thereof.

Now, the reasons for mixing the photosynthetic bacteria in the lower deodorization chamber 11, and the activated sludge bacteria in the middle level deodorization chamber 10 and the upper deodorization chamber 9, as well as species, functions, and so forth of the bacteria, microorganisms, and the like as described above are described hereinafter.

More specifically, the process water W2D in the lower deodorization chamber 11, the process water W2M in the middle level deodorization chamber 10, and the process water W2U in the upper deodorization chamber 9 are different from each other in that each is used for the primary, the secondary, and the tertiary processing, respectively. In the process water W2D containing a high concentration of pollutant of the exhaust gas G, the photosynthetic bacteria having excellent reproductivity and growth potential in such an environment are mixed while in the process water W2M and W2U, for use after the primary processing, having a lower concentration of pollutant, the activated sludge bacteria suited for such an environment are mixed.

Since the photosynthetic bacteria grow taking in oxygen under an aerobic condition while taking in solar energy under an anaerobic condition, the lower reservoir 15 is aerated to supply oxygen thereto, or an attempt to activate the photo- synthetic bacteria is made by providing the tower main body 6 with a window.

As the photosynthetic bacteria tend to choose organic matters and noxious substances contained in polluted water as resources of nutrition, and has capacity to reduce the noxious substances innoxious, while adaptable to operation under a high BOD load, these bacteria therefore are suited for use in the primary operation to reduce high BOD.

In the foregoing description, the photosynthetic bacteria and the activated sludge bacteria, mixed in the process water W2D, and the like, are cited as the microorganisms and bacteria used in the deodorizing system 1, however, when the deodorizing system 1 is in regular operation, an action described as follows also takes place.

Microorganisms decomposing offensive odor constituents are mainly the photosynthetic bacteria and the activated sludge bacteria, however, depending on chemical composition of the exhaust gas. G, the process water W2D, and the like, there will occur spontaneous generation of new microorganisms suited for decomposition of such constituents.

Such spontaneous generation of the new microorganisms, being a normal phenomenon occurring in nature, occurs in the deodorizing system 1 according to the invention as well under the same mechanism. The new microorganisms generated spontaneously also contribute to decomposition of offensive odor constituents and deodorization.

As there exist a variety of species of photosynthetic bacteria and activated sludge bacteria, microbial cells found effective by prior analysis of the exhaust gas G are fed into the deodorizing system 1 at the start of operation.

Beneficial effects of the invention are summed up hereinafter.

With the deodorizing system 1 according to the invention, wherein the inner space of the tower main body 6 is partitioned into the upper deodorization chamber 9, the middle level deodorization chamber 10, and the lower deodorization chamber 11, defined by the horizontal partition walls 8, 8a, respectively, the link-ups 13, 13a are installed upright on the horizontal partition walls 8, 8a, respectively, for linking a deodorization chamber above with a deodorization chamber below (that is, between the upper deodorization chamber 9, and the middle level deodorization chamber 10 and also between the middle level deodorization chamber 10 and the lower deodorization chamber 11), and the exhaust gas ducts 16, 16a are installed in the upper part of the lower deodorization chamber 11 while the exhaust outlet 7 is installed in the upper deodorization chamber 9, deodorization treatment is applied in three stages to the exhaust gas G emitted from the exhaust gas ducts 16, 16a into the lower deodorization chamber 11 so that a deodorization degree is enhanced, enabling the exhaust gas G to become odorless and discharged from the exhaust outlet 7.

Further, with the deodorizing system 1, wherein the lower reservoir 15 for the process water W2D with the photosynthetic bacteria mixed therein is disposed in the lower part of the lower deodorization chamber 11, and the sprinklers 17, 17a, and so forth for sprinkling the process water W2D, W2R against the exhaust gas G emitted from the exhaust gas ducts 16, 16a, are installed in the lower deodorization chamber 11, the exhaust gas G at high temperature, emitted from the exhaust gas ducts 16, 16a, comes in contact with the process water W2D, W2R, sprinkled in filmy state by the sprinklers 17, 17a, and cooled down, thereby bringing high temperature conditions in the upper deodorization chamber 9, and the middle level deodorization chamber 10 under control, and preventing adverse effects on microorganisms.

Also it is possible to deodorize the exhaust gas G (primary processing) by causing the process water W2D, W2R, which have been sprinkled, to absorb dust, and water soluble offensive odor constituents such as ammonia, lower amine, formaldehyde, lower organic acids, and the like, which are contained in the exhaust gas G, to reduce amounts of residual offensive odor constituents contained in the exhaust gas G ascending into the middle level deodorization chamber 10, to provide a habitat environment suitable for the activated sludge bacteria in the middle level deodorization chamber 10, and so forth by lowering a BOD value of the process water W2M, and W2U, respectively, and also to reduce a risk of the pores of adsorbents being clogged in the middle level deodorization chamber 10, and so forth where the exhaust gas G is delivered since dust is removed through operation of the sprinklers 17, 17a, and so forth.

Furthermore, it is possible to decompose and remove efficiently the organic matters such as dust and the water soluble offensive odor constituents by the agency of microorganisms in the lower reservoir 15 by dropping the dust and the water soluble offensive odor constituents into the process water W2D in the lower reservoir 15, mixed with the photosynthetic bacteria adaptable to operation under a high BOD load.

As the upper reservoir 27, and the middle level reservoir 21, for the process water W2U, and W2M, respectively, with the activated sludge bacteria mixed therein, are disposed in the lower part of the upper deodorization chamber 9, and the middle level deodorization chamber 10, respectively, and a portion of space above the upper reservoir 27 in the upper deodorization chamber 9 is filled up with the upper filler MU having the sources of nutrition supply and adsorbability while a portion of space above the middle level reservoir 21 in the middle level deodorization chamber 10 is filled up with the middle level filler MM having adsorbability, dust, that is, particulates contained in the exhaust gas G after the primary processing applied in the lower deodorization chamber 11, and the residual offensive odor constituents of the exhaust gas G can be removed by adsorption with the adsorbents, and decomposition by the agency of microorganisms, which proceed simultaneously. Since the offensive odor constituents basically do not accumulate in the adsorbents, continuous operation over a long period of time is made possible.

As deodorization processing is carried out in two stages, that is, in the upper deodorization chamber 9 as well as the middle level deodorization chamber 10, and in addition, with the use of the adsorbents of different types, the upper deodorization chamber 9 has microorganisms having a higher reproductivity therein, resulting in a higher deodorizing capacity. As a result, the residual offensive odor constituents which have not been removed in the middle level deodorization chamber 10 can be removed therein, enabling the exhaust gas G to be made odorless while deodorization primarily through adsorptive action can be attained in the middle level deodorization chamber 10 against sudden increase in the offensive odor constituents.

As the spray nozzles 28, 28a, and so forth, and the spray nozzles 22, 22a, and so forth are disposed above the upper filler MU, and the middle level filler MM, provided in the upper deodorization chamber 9 and the middle level deodorization chamber 10, respectively, for spraying the process water W2U, and the process water W2M, filled in the upper reservoir 27, and the middle level reservoir 21, respectively, the biofilm and ions of sulfuric acid, produced through reaction mechanism of the activated bacteria in the course of deodorization operation, can be removed by washing with the process water W2U, and W2M, respectively, so that deodorizing capacity can be maintained by eliminating causes for inhibiting reaction of microorganisms while allowing the activated sludge bacteria to be reproduced in and supported by the adsorbents prior to initial operation.

As the upper filler MU, and the middle level filler MM, having adsorbability, filled in the upper deodorization chamber 9 and the middle level deodorization chamber 10, respectively, are composed of porous adsorbents with pores of average diameter not less than about 100 Å, holding capacity thereof for microorganisms can be enhanced in comparison with activated charcoal. Further, as the upper filler MU filled in the upper deodorization chamber 9, having the sources of nutrition for microorganisms, and adsorbability, is made by granulating mixture of porous matters, matters having the sources of nutrition supply for microorganisms, and soil after adding binders thereto, the same is full of gaps between various matters, and contains highly water absorptive matters (soil composed primarily of volcanic ash, and the like), having excellent adsorbability for microorganisms, and water holding capacity so that a habitat environment suitable for microorganisms can be prepared.

With activated carbon, typical of adsorbents, which is completely carbonized, and has low water holding capacity because of small pores of average diameter in the range of 10 to 20 Å and low capacity for supporting microorganisms, lacking in sources of nutrition supply for microorganisms, it is impossible to achieve sufficient deodorization by the agency of microorganisms having difficulty in attaining spontaneous reproduction.

As the upper filler MU is produced by granulating a mixture of a porous matter made by roasting an organic matter in a covered vessel and soil with the use of binders added thereto, and the roasted charcoal produced by the destructive distillation of rice hulls in a covered vessel is used as the porous matter made by roasting an organic matter in a covered vessel, matters providing the sources of nutrition supply for microorganisms combined with porous matters into one can be secured in large quantities at a low cost.

Since the mist collector 12 is installed inside the exhaust outlet 7, when particulates of the process water W2U containing water soluble offensive odor constituents are generated by the spray nozzles 28, 28a, and so forth in the upper deodorization chamber 9, and ascend together with the exhaust gas G after deodorized, mist composed of the particulates is removed with the mist collector 12, and only gaseous matter is allowed to pass through, preventing emission of the particulates containing water soluble offensive odor constituents into the atmosphere.

With the deodorizer housing activated charcoal therein, linked with the exhaust outlet 7, even if the effect of deodorization by the agency of microorganisms, and the like is insufficient, residual offensive odor constituents of the exhaust gas G before emission into the atmosphere are adsorbed by the activated charcoal, thereby achieving deodorization.

The aerator 19 is disposed in the lower reservoir 15 of the lower deodorization chamber 11 for aeration with external air A so as to secure an amount of dissolved oxygen by dissolving oxygen in the process water W2D in the lower reservoir 15, particularly, by supplying oxygen necessary for photosynthetic bacteria to live and to be activated, in an attempt to maintain and multiply the number of aerobic bacteria such as photosynthetic bacteria and the like, and also to activate these bacteria, thereby promoting processing of the exhaust gas G by the agency of microorganisms so that processing of polluted water, and water issuing offensive odor, and deodorization efficiency can be enhanced As the filtering and water storage part 39 is installed in the filter cell 5 disposed separately from the tower main body 6, and the filtering box 40 disposed in the filtering and water storage part 39 is filled up with the filtering filler MR having adsorbability while the sprinkling pipes 44, 44a, and so forth are horizontally installed above the filtering box 40, connecting the inlets of the sprinkling pipes 44, 44a, and so forth to the piping 20 leading to the lower deodorization chamber 11 of the tower main body 6 so as to allow the process water W2D in the lower reservoir 15 of the lower deodorization chamber 11 to flow freely therethrough, residual offensive odor constituents still remaining even after the primary processing and the fourth processing carried out in the lower deodorization chamber 11 can be removed in the process of passing through the filtering filler MR by means of the same operation as in the middle level deodorization chamber 10.

Further, as the filtering and water storage part 39 of the filter section 37 is linked with the sprinklers 17, 17a in the lower deodorization chamber 11 via the circulatory pump PR, the process water W2R cleansed in the filter section 37 can be reused for sprinkling against the exhaust gas G in the lower deodorization chamber 11, and the photosynthetic bacteria and so forth can be sent back to the lower deodorization chamber 11.

The filtering filler MR having adsorbability are composed of porous adsorbents with pores of average diameter not less than about 100 Å, holding capacity thereof for microorganisms can be enhanced.

As the filtering filler MR in the filter cell 5 is filled on top of the bottom plate 42 of the filtering box 40, formed of the perforated material, and means for stirring up the filtering filler MR are provided, the biofilm adhered to the surface of the filtering filler MR as a result of purifying action of polluted water dissolving and absorbing offensive odor constituents, and so forth is peeled off due to mutual contact friction between the adsorbents composing the filtering filler MR, and is caused to drop through perforations of the bottom plate 42, enabling the filtering filler MR to restore adsorptive and decomposing capacity thereof.

The stirring means comprising the stirring axles 45, 45a freely rotatably installed in the filtering box 40 with the bar stirrer 46, 46a, and so forth attached thereto enables the filtering filler MR to be stirred up with ease.

As the filter section 37 is constructed such that the process water W2R is allowed to pass freely through the upper part of the sidewall plate 40a between the filtering box 40 and the filtering and water storage part 39, the suspended particles generated when stirring up the filtering filler MR can be released into the filtering and water storage part 39 through the release port 60 of the sidewall plate 40a by sliding the sliding block plate 62 up, thereby preventing retention of the suspended particles in large quantities inside the filtering box 40 so that rehabilitation of the filtering filler MR and downstream flow of the process water W2R in the filtering box 40 can be smoothly executed.

Further, as the deodorizing system 1 is constructed such that water is supplied from the lower reservoir 15 to the filter cell 5 so as to maintain a water level in the lower reservoir 15 at a predetermined level, an amount of water necessary for the photosynthetic bacteria to live can be maintained. Furthermore, as the float switch 52 for detecting a water level of the filtering and water storage part 39 and supply means for supplying the neutral supply water W1 to the lower reservoir 15 are provided so that the supply means are activated by the float switch 52 when the water level of the filtering and water storage part 39 falls below a predetermined level, the neutral supply water W1 is automatically supplied even if quantities of the process water W2D, and W2R decline due to evaporation and so forth, maintaining the water level thereof. Thus, sprinkling on the exhaust gas G can be ensured and driving of the circulatory pump PR without water, or breakdown thereof can be prevented.

The filter cell 5 is partitioned by the partition wall 36 set upright in the cell main body 35, defining the filter section 37 having the filtering and water storage part 39, and the discharge section 38, and the discharge port 53 for allowing the supernatant fluid of the process water W2R to overflow into the discharge section 38 is opened in the partition wall 36. With such a construction, accumulation of solid suspended particles in the process water W2R of the filter cell 5 is prevented by discharging the solid suspended particles from the filter cell 5, enabling smooth circulation of the process water W2R. Further, as the filter 54 is installed between the discharge port 53 and the drainage outlet 55, residual organic matters which have not been removed even by the photosynthetic bacteria and the activated sludge bacteria, in the lower reservoir 15 and the filtering and water storage part 39, and solid organic matters of the offensive odor constituents can be removed by the filter 54, thereby discharging the process water thus cleansed.

As the discharge port 53 formed of the plurality of overflow orifices in the shape of an inverted triangle is provided on the upper end of the partition wall 36, water flowing along the upper end of the partition wall 36 from the filtering and water storage part 39 to the discharge section 38 in the filter section 37 assumes a form such that a quantity of water passing through the discharge port 53 increases by a factor of a sectional area of the discharge port 53 multiplied by a difference in the water level of the filtering and water storage part 39 upon an increase of the water level because of a wider sectional area of the discharge port 53, at the upper end thereof so that the water level of the filtering and water storage part 39 can be maintained substantially at a constant level with ease.

As the water supply piping 33 for supplying the neutral supply water W1 is linked with the upper reservoir 27, the middle level reservoir 21, and the lower reservoir 15, respectively, the process water W2U, W2M, and W2D, pH values of which become lower due to an increase in ions of sulfuric acid generated in the upper reservoir 27, the middle level reservoir 21, and the lower reservoir 15, are diluted by supply of the neutral supply water W1, thereby maintaining pH at adequate levels to inhibit acidification of the process water. Thus, deterioration in the habitat environment for microorganisms is prevented, and causes for blocking activation of decomposing capacity of microorganisms are eliminated, thereby maintaining deodorizing performance of the deodorizing system 1.

Further, a rise in the temperature of the process water such as W2D, and the like, caused by continuous inflow of the exhaust gas G, is inhibited by supply of the neutral supply water W1, enabling the habitat environment suitable for microorganisms to be maintained, or the process water discharged to be diluted.

The overflow piping 34, 34a has an inlet thereof disposed in the upper reservoir 27, and the middle level reservoir 21, respectively, and the downstream outlet thereof disposed in the lower deodorization chamber 11, or the filter cell 5. Accordingly, in spite of an increase in the quantity of the process water W2U and W2M, in the upper reservoir 27, and the middle level reservoir 21, respectively, by supply of the neutral supply water W1, the water level of the respective process water can be held constant, enabling the function of the upper spraying system WU and the middle level spraying system WM to be maintained, and ensuring treatment of polluted water (the process water W2U and W2M, highly concentrated) in the lower deodorization chamber 11, or the filter cell 5 where the polluted water is delivered. In addition, floating smut and highly concentrated polluted water dropping from the upper filler MU and the middle level filler MM can be discharged by sending out the supernatant fluid.

As the downstream outlet of the overflow piping 34, 34a, installed in the upper reservoir 27, and the middle level reservoir 21, respectively, is disposed within the process water W2D, W2R, and as a result, the overflow piping 34, 34a, on the outlet side is under pressure in the process water W2D, W2R, it is therefore possible to eliminate a risk of the exhaust gas G emitted from the upper deodorization chamber 9 or the middle level deodorization chamber 10, under high pressure, making reverse flow or other unexpected flow.

As described hereinbefore, the circulatory microorganic deodorizing system 1 according to the invention has significant practical merits.

What is claimed is:

1. A circulatory microorganic deodorizing system comprising:

a tower main body, the inner space of which is partitioned into an upper deodorization chamber, a middle level deodorization chamber, and a lower deodorization chamber by two horizontal partition walls, link-ups being installed upright on each of the horizontal partition walls for linking the upper deodorization chamber with the middle level deodorization chamber, and linking the middle level deodorization chamber with the lower deodorization chamber, respectively, and the upper deodorization chamber being provided with an exhaust outlet while the lower deodorization chamber being provided with exhaust gas ducts in the upper part thereof;

a lower reservoir for process water with photosynthetic bacteria mixed therein, provided in the lower part of the lower deodorization chamber;

sprinklers for sprinkling the process water of the lower reservoir towards exhaust gas ducts, provided in the lower deodorization chamber; and an upper reservoir and a middle level reservoir, for process water with activated sludge bacteria mixed therein, provided in the lower part of the upper deodorization chamber and the middle level deodorization chamber, respectively, an upper filler having sources of nutrition supply for microorganisms as well as adsorbability being filled above the upper reservoir of the upper deodorization chamber while a middle level filler having adsorbability being filled above the middle level reservoir of the middle level deodorization chamber, spray nozzles for spraying the process water of the upper reservoir and the middle level reservoir being disposed above said upper filler and said middle level filler in the upper deodorization chamber and the middle level deodorization chamber, respectively.

2. A circulatory microorganic deodorizing system according to claim 1, wherein the upper filler and the middle level filler, having adsorbability and filled in the upper deodorization chamber and the middle level deodorization chamber, respectively, are composed of a porous matter with pores of average diameter not less than about 100 Å.

3. A circulatory microorganic deodorizing system according to claim 1, wherein the upper filler that fills the upper deodorization chamber is made by mixing a porous matter having the sources of nutrition supply for microorganisms and soil together to form a mixture, and by granulating the mixture after adding a binder thereto.

4. A circulatory microorganic deodorizing system according to claim 3, wherein the porous matter is produced by the destructive distillation of an organic matter in a covered vessel.

5. A circulatory microorganic deodorizing system according to claim 3, wherein the porous matter comprises roasted charcoal produced by the destructive distillation of rice hulls in a covered vessel.

6. A circulatory microorganic deodorizing system according to claim 1, wherein a mist collector is installed inside the exhaust outlet.

7. A circulatory microorganic deodorizing system according to claim 6, wherein a deodorizer filled up with activated charcoal is linked with the exhaust outlet.

8. A circulatory microorganic deodorizing system according to claim 1, wherein an aerator is disposed in the lower reservoir of the lower deodorization chamber so as to aerate the process water therein with external air.

9. A circulatory microorganic deodorizing system according to claim 1, wherein a filter cell disposed separately from the tower main body is provided with a filtering and water storage part in a filter section thereof, and a filtering box installed in the filtering and water storage part is filled up with a filtering filler having adsorbability, providing an inlet above the filtering filler such that the process water in the lower reservoir of the lower deodorization chamber in the tower main body is fed freely to the inlet while linking the filtering and water storage part of the filter section with the sprinklers in the lower deodorization chamber via a circulatory pump.

10. A circulatory microorganic deodorizing system according to claim 9, wherein the filtering filler filled up in the filtering box is composed of a porous matter with pores of average diameter not less than about 100 Å.

11. A circulatory microorganic deodorizing system according to claim 9, wherein the filtering filler in the filtering box is filled on a bottom plate with perforations, and stirring means for stirring up the filtering filler is provided.

12. A circulatory microorganic deodorizing system according to claim 11, wherein the stirring means is made up of stirring axles with stirring bars fixed thereto, installed in the filtering filler in such a way as to be freely rotatable.

13. A circulatory microorganic deodorizing system according to claim 11, wherein the process water is allowed to be freely passable above a sidewall plate of the filtering box between the filtering box and the filtering and water storage part.

14. A circulatory microorganic deodorizing system according to claim 9, wherein water is supplied from the lower reservoir to the filter cell so as to maintain a water level in the lower reservoir at a predetermined level, and a float switch for detecting a quantity of the process water in the filtering and water storage part and supply means for supplying neutral supply water to the lower reservoir are provided such that the supply means are activated by the float switch when a water level of the filtering and water storage part falls below a predetermined level.

15. A circulatory microorganic deodorizing system according to claim 9, wherein the filter cell is partitioned by a partition wall provided in a cell main body thereof, defining the filter section having the filtering and water storage part and a discharge section, and a discharge port for allowing supernatant fluid of the process water to overflow into the discharge section is opened in the partition wall, and a filter is installed between the discharge port and a drainage outlet provided on the underside of the discharge section.

16. A circulatory microorganic deodorizing system according to claim 15, wherein the discharge port comprises a plurality of overflow orifices in the shape of an inverted triangle at an upper end of the partition wall.

17. A circulatory microorganic deodorizing system according to claim 15, wherein water supply piping for supplying the neutral supply water is connected to the upper reservoir, the middle level reservoir or the lower reservoir, and an inlet of overflow piping is disposed in the upper reservoir or the middle level reservoir while an outlet thereof is disposed in the lower deodorization chamber or the filter cell.

18. A circulatory microorganic deodorizing system according to claim 17, wherein the outlet of the overflow piping provided in the upper deodorization chamber or the middle level deodorization chamber is disposed within the process water in the lower reservoir or the filtering and water storage part.

* * * * *